United States Patent
Pakhomchik et al.

(10) Patent No.: US 12,137,170 B2
(45) Date of Patent: Nov. 5, 2024

(54) METHOD FOR DETERMINING A PREIMAGE ELEMENT OF A CRYPTOGRAPHIC HASH FUNCTION, COMPUTER PROGRAM, AND DATA PROCESSING SYSTEM

(71) Applicant: Terra Quantum AG, St. Gallen (CH)

(72) Inventors: Aleksei Pakhomchik, St. Gallen (CH); Vladimir Voloshinov, St. Gallen (CH)

(73) Assignee: TERRA QUANTUM AG, Rorschach (CH)

( * ) Notice: Subject to any disclaimer, the term of this patent is extended or adjusted under 35 U.S.C. 154(b) by 386 days.

(21) Appl. No.: 17/529,445

(22) Filed: Nov. 18, 2021

(65) Prior Publication Data
US 2022/0166627 A1 May 26, 2022

(30) Foreign Application Priority Data
Nov. 25, 2020 (EP) .................................. 20209837

(51) Int. Cl.
*H04L 9/32* (2006.01)
*H04L 9/06* (2006.01)

(52) U.S. Cl.
CPC .......... *H04L 9/3242* (2013.01); *H04L 9/0643* (2013.01); *H04L 9/3239* (2013.01)

(58) Field of Classification Search
None
See application file for complete search history.

(56) References Cited

U.S. PATENT DOCUMENTS 7,424,451 B1 * 9/2008 Moore ................... G06Q 40/00
 705/37
2015/0262074 A1 9/2015 Bruestle et al.
(Continued)

FOREIGN PATENT DOCUMENTS

JP 2017-515195 A 6/2017
JP 2019-145970 A 8/2019

OTHER PUBLICATIONS

"Cryptographic hash function," *Wikipedia*, 12 pp. (Feb. 23, 2019) Retrieved from: https://en.wikipedia.org/w/index.php?title=Cryptographic_hash_function&oldid=884762252 [on May 26, 2020].
(Continued)

*Primary Examiner* — Jeffrey R Swearingen
(74) *Attorney, Agent, or Firm* — Leydig, Voit & Mayer, Ltd.

(57) ABSTRACT

A method for determining a preimage element of a cryptographic hash function includes providing an output value of a cryptographic hash function and hash function operations of the cryptographic hash function; for each of the hash function operations, determining at least one hash function relation, comprising an equation and/or an inequality; determining an optimization problem comprising: the output value, at least one constraint assigned to an iteration of the cryptographic hash function, and optimization variables comprising internal state variables of the cryptographic hash function and at least one preimage variable, wherein the at least one constraint is determined from the at least one hash function relation and comprises preceding internal state variables assigned to a preceding iteration; and solving the optimization problem and determining a preimage element of the cryptographic hash function from an optimizing value of the at least one preimage variable.

15 Claims, 4 Drawing Sheets

(56) References Cited

U.S. PATENT DOCUMENTS

2017/0251003 A1* 8/2017 Rostami-Hesarsorkh ................... G06N 5/01
2021/0256113 A1* 8/2021 Stott ..................... H04L 9/3239

OTHER PUBLICATIONS

Canadian Patent Office, Office Action in Canadian Patent Application No. 3139493, 5 pp. (Mar. 3, 2023).
Bao et al., "Automatic Search of Meet-in-the-Middle Preimage Attacks on AES-like Hashing," *International Association for Cryptologic Research*, 20200424:110623, 45 pp. (Apr. 23, 2020).
European Patent Office, Office Action in European Patent Application No. 20209837.2, 7 pp. (Feb. 8, 2023).
Hisobe, "Chorus: A Geometric Constraint Solver with a Module Mechanism," *WISS 2000*, 91-100.
Japanese Patent Office, Office Action in Japanese Patent Application No. 2021-186248, 6 pp. (Apr. 4, 2023).
Liu et al., "Preimage Attacks on Reduced Troika with Divide-and-Conquer Methods," *Advances in Databases and Information Systems*, pp. 306-326 (Jul. 24, 2019).
Bian et al., "Solving SAT and MaxSAT with a Quantum Annealer: Foundations, Encodings, and Preliminary Results," Arxiv.org, Cornell University Library, Ithaca NY (2018).
De et al., "Inversion Attacks on Secure Hash Functions Using SAT Solvers," Theory and Applications of Satisfiability Testing—SAT 2007, Springer Berlin Heidelberg, Germany, 377-382 (2007).
European Patent Office, European Search Report in European Patent Application No. 20209837.2, dated Apr. 29, 2021.
Legendre et al., "From a Logical Approach to Internal States of Hash Functions How SAT Problem Can Help to Understand SHA-x and MDx," 2013 International Conference on Security and Cryptography (Secrypt), Scitepress, 1-9 (2013).
Sasaki et al., "Finding Preimages in Full MD5 Faster than Exhaustive Search," Lecture Notes in Computer Science, Springer Berlin Heidelberg, Germany, 134-152 (2009).

\* cited by examiner

METHOD FOR DETERMINING A PREIMAGE ELEMENT OF A CRYPTOGRAPHIC HASH FUNCTION, COMPUTER PROGRAM, AND DATA PROCESSING SYSTEM

CROSS-REFERENCE TO RELATED APPLICATIONS

This patent application claims the benefit of European Patent Application No. 20209837.2, filed Nov. 25, 2020, which is fully incorporated herein by reference.

TECHNICAL FIELD

The present disclosure refers to techniques for determining a preimage element of a cryptographic hash function, in particular on a quantum computer, such as a quantum annealing device.

BACKGROUND

Inverting cryptographic hash functions relates to an analysis of their respective cryptographic strength. For a hash function H: X→Y, where X is a set of input values (input bit sequences, messages) and Y is a set of output values (hash values, bit sequences of a fixed length), the size |y| of an element y in Y is usually much smaller than |x|. Hence, a hash function is not bijective, and the equation $$H(x)=y \tag{1}$$

will in general have many solutions, i.e., the set $H^{-1}(y)=\{x: H(x)=y\}$ (the set of preimage elements or inverse image elements corresponding to a certain hash value y) may contain many elements. Nevertheless, the search for any of them is a computationally hard problem for "strong" hash functions. In recent years, hash functions have been used as a key element in blockchain technology. The most computing power consuming phase, the so-called mining, may also be understood as solving the following inequality:

$$H(\{x, x_{fixed}\}) \leq y, \tag{2}$$

wherein $\{x, x_{fixed}\}$ is an argument of the hash-function H comprising an unknown part x (so-called nonce, usually a 4-byte field) and a fixed remaining part $x_{fixed}$ with a block header, and the hash value y corresponding to a predefined threshold value. The left side and the right side of Eq. (2) are bit sequences, but can also be interpreted as binary representations of integer numbers. With this, from Eq. (2) follows that a predefined number of leading bits of the hash value y are all equal to zero. In case of, e.g., the hash function H being a 128 bit hash function, the hash value y can be written as a (finite) sequence $y=(y_k)_{k=1, \ldots, 128}$ with $y_m$ being a first (from the left) non-zero bit in the sequence $(y_k)_{k=1, \ldots, 128}$. Hence, Eq. (2) is equivalent to $$[H(\{x, x_{fixed}\})]_k = 0 (k=1:(m-1)), \tag{2'}$$

with (m−1) of the leading bits of the hash function H being equal to zero. With this, one of the set of preimage elements can be determined.

There are two main types of accessing or modifying inputs processed by cryptographic hash functions: collision attacks and preimage attacks. In a collision attack, the goal is to find two different messages $x_1, x_2$ such that $H(x_1)=H(x_2)$. This type of attack on MD5 cryptographic hash functions is already known and requires around $2^{18}$ MD5 compressions, which still is much less than an exhaustive search (requiring $2^{64}$ MD5 compressions). Such an attack can thus be carried out on a regular PC. A preimage attack, on the other hand, is more complex, but also more powerful than a collision attack. During a preimage attack, an x is to be determined for a given y such that $H(x)=y$. For MD5, such attacks are presently only theoretical, i.e., while fewer MD5 compressions than an exhaustive search are required ($2^{123.4}$ vs. $2^{128}$), known preimage attacks are still practically impossible to complete on available computers.

SUMMARY

It is an object of the present disclosure to provide a method for determining a preimage element corresponding to a hash value processed by a cryptographic hash function in an efficient and resource-conserving manner.

For solving the problem, a method for determining a preimage element of a cryptographic hash function, carried out in a data processing system, according to independent claim 1 is provided. Further, a computer program and a data processing system are provided according to independent claims 14 and 15, respectively. Further embodiments are disclosed in dependent claims.

According to one aspect, a method for determining a preimage element of a cryptographic hash function, carried out in a data processing system, is provided. The method comprises providing an output value of a cryptographic hash function and hash function operations of the cryptographic hash function; for each of the hash function operations, determining at least one hash function relation, comprising an equation and/or an inequality; and determining an optimization problem. The optimization problem comprises the output value, at least one constraint (optimization relation) assigned to an iteration of the cryptographic hash function, and optimization variables comprising internal state variables of the cryptographic hash function and at least one preimage variable. The at least one constraint is determined from the at least one hash function relation and comprises preceding internal state variables assigned to a preceding iteration. The method further comprises solving the optimization problem and determining a preimage element of the cryptographic hash function from an optimizing value of the at least one preimage variable.

According to another aspect, a computer program and/or a computer program product is provided comprising instructions which, when the computer program and/or the computer program product is carried out in a data processing system, cause the data processing system to perform the steps of the method for determining a preimage element of a cryptographic hash function.

According to a further aspect, a data processing system is provided which is configured to determine a preimage element of a cryptographic hash function by performing the following steps: providing an output value of a cryptographic hash function and hash function operations of the cryptographic hash function; for each of the hash function operations, determining at least one hash function relation, comprising an equation and/or an inequality; determining an optimization problem; and solving the optimization problem and determining a preimage element of the cryptographic hash function from an optimizing value of the at least one preimage variable. The optimization problem comprises the output value, at least one constraint assigned to an iteration of the cryptographic hash function, and optimization variables comprising internal state variables of the cryptographic hash function and at least one preimage variable. The at least one constraint is determined from the at least one hash function relation and comprises preceding internal state variables assigned to a preceding iteration.

The at least one hash function relation may comprise the preceding internal state variables assigned to the directly preceding iteration. The optimization problem may comprise a plurality of constraints. The cryptographic hash function may comprise a plurality of iterations, in particular, 48, 64, 80, or 128 iterations. Preferably, each one of the constraints may be assigned to one of the iterations. Further, each one of the iterations may be assigned at least one of the constraints. Each one of the iterations may be assigned at least one of the constraints, each of which may comprise at least one of the preceding internal state variables assigned to the directly preceding iteration. The constraints may comprise at least one of optimization equations, optimization inequalities, and an objective function. Notably, when employing Eq. (1) or Eq. (2) for the optimization problem, no explicit objective function (e.g., to be minimized) may be required. Hence, the optimization problem may comprise a dummy zero constant objective function. Some of the plurality of constraints may also be transformed to objective function elements as penalty terms.

The optimizing value of the at least one preimage variable may be assumed when a minimum and/or a maximum of the optimization problem is determined. The optimization problem may comprise a plurality of preimage variables, for example 16 preimage variables. The preimage element may be determined by concatenating the optimizing values of the preimage variables. The minimum and/or the maximum may be global and/or local.

The output value of the cryptographic hash function may be a hash value (digest), preferably with a size of 128 or 160 bits.

The hash function operations may comprise at least one of: a nonlinear Boolean function, a left bit rotation, a right bit rotation, and a modular addition, in particular at least one of $$F(B,C,D)=(B \wedge C) \vee (!B \wedge D),$$

$$G(B,C,D)=(B \wedge D) \vee (C \wedge !D),$$

$$H(B,C,D)=B \oplus C \oplus D,$$

$$I(B,C,D)=C \oplus (B \vee !D), \text{ and}$$

$$J(B,C,D)=(B \wedge C) \vee (B \wedge D) \vee (C \wedge D). \tag{3}$$

At least one of the hash function operations, preferably each one of the function operations, may be assigned to an iteration and/or a round of the cryptographic hash function.

The left bit rotation may comprise left rotating bits by one place or a plurality of places. The right bit rotation may comprise right rotating bits by one place or a plurality of places. The number of rotated places may depend on the iteration and/or round assigned to the left bit rotation and/or right bit rotation.

The method may comprise determining elementary operations of at least one of the hash function operations; for each of the elementary operations, determining at least one elementary relation, comprising an elementary equation and/or an elementary inequality; and determining the at least one hash function relation from the elementary relations of the at least one hash function operation. Preferably, the elementary operations may comprise at least one of NOT, AND, OR, and XOR.

In an embodiment, all of the hash function relations may be determined from the elementary relations. Alternatively, at least one or all of the hash function relations are determined directly from the hash function operations.

The at least one of the hash function relations and/or at least one of the elementary relations may comprise a bilinear equation and/or a linear equation, preferably comprising at least one of continuous variables, binary variables, and integer variables.

The at least one of the hash function relations and/or the at least one of the elementary relations may have the form $\vec{c}_x^T \vec{x} + \vec{c}_a^T \vec{a}_x = b$, wherein the binary variables and/or integer variables comprise $\vec{a}_x$ and $\vec{x} = (\vec{y}, q(\vec{y}))$, and the continuous variables comprise $b$, $\vec{c}_x$, and $\vec{c}_a$, wherein $q$ is one of the hash function operations and/or on of the elementary operations.

At least one of the continuous and/or binary variables may be determined by solving an initial optimization problem (auxiliary optimization problem), preferably a constrained quadratic problem.

In particular, the variables $\vec{a}_x$, $b$, $\vec{c}$ and $\vec{e}$ may be determined by solving the initial optimization problem. The initial optimization problem may comprise an objective function of the form $(c_1 - 1)^2$, wherein $c_1$ is the first component of $\vec{c}$. The form allows for normalization. The initial optimization problem may comprise auxiliary constraints comprising at least one of $\vec{c}^T \vec{x} + \vec{e}^T \vec{a} = b$ and $\vec{c}^T \vec{x} + \vec{e}^T \vec{a} \neq b$. In particular, the initial optimization problem may be $$\min_{\vec{a}_x, b, \vec{c}, \vec{e}} (c_1 - 1)^2 \text{ subject to} \begin{cases} \vec{c}^T \vec{x} + \vec{e}^T \vec{a}_x = b(\forall\, x \in f) \\ \vec{c}^T \vec{x} + \vec{e}^T a \neq b(\forall\, x \notin f \forall\, \vec{a} \in \{0,1\}^{N_a}) \end{cases} \tag{4}$$

Here, $f$ denotes a set of feasible configurations and $N_a$ denotes a number of auxiliary variables in Eq. (4).

The at least one of the hash function relations and/or the at least one of the elementary relations, preferably determined by the initial optimization problem, may comprise a linear equation with continuous coefficients, preferably integer-valued coefficients, and binary variables.

For example, at least one of the elementary relations may comprise at least one of $x+y-1=0$, $x+y-2z-a=0$, $x+y-2z+a=0$, and $x+y-z-2a=0$, wherein $x$, $y$, $z$, and $a$ are binary variables. Further, at least one of the hash function relations may comprise at least one of $x+3y+2z-6F+2a_0-3a_1+2a_2=0$, $3x+2y-z-6G-3a_0+2a_1+2a_2=0$, $x+y+z-H-2a_0=0$, $x+2y-z-2I+a_0-4a_1=0$, and $x+y+z-2J-a=0$, wherein $x$, $y$, $z$, $F$ to $J$, and $a_0$ to $a_2$ are binary variables.

At least one of the elementary relations may also comprise at least one of the following sets of elementary inequalities: $\{z \leq x,\ z \leq y,\ z \leq x+y-1\}$; $\{x \leq z,\ y \leq z,\ z \leq x+y,\ z \leq 1\}$; and $\{z \leq x+y,\ z \geq x-y,\ z \geq y-x,\ z \leq 2-x-y\}$, wherein $x$ and $y$ are binary variables and $z$ is a continuous variable. The inequalities of the hash function relations may be determined from at least one of the sets of elementary inequalities.

An initial internal state value and/or a final internal state value, preferably assigned to the last iteration, may be fixed when solving the optimization problem. The optimization variables may be without the internal state variables assigned to the last iteration.

The method may further comprise at least partially presolving the optimization problem before solving the optimization problem. By presolving the optimization problem, the number of constraints and/or optimization variables may be reduced. The presolving may comprise determining values, preferably optimal values, of the optimization problem. The presolving may also comprise determining at least one substitute constraint substituting at least one other of the constraints.

The optimization problem may be a mixed-integer linear program (MILP), mixed-integer nonlinear program (MINLP), or a quadratic unconstrained binary optimization (QUBO) problem. The optimization problem may also be a constrained integer program. An objective function of the QUBO problem may be determined from the constraints determined for the MILP and/or the MINLP, preferably by squaring the constraints. The optimization problem may comprise a discrete search space.

The optimization problem may be solved (at least partially) in a quantum processing device of the data processing system, preferably a quantum annealing device.

For example, the quantum annealing device may a D-Wave annealing device. The optimization problem may also be solved on a universal quantum computer. To this end, a quantum approximate optimization algorithm may be employed to solve the optimization problem.

Alternatively, the optimization problem may be solved only in a classical processing device, preferably of the data processing system. The classical processing device may comprise a processor and a memory. Determining the elementary relations, determining the hash function relations, determining the optimization problem, and/or determining the preimage element of the cryptographic hash function from the optimizing value of the at least one preimage variable may be carried out in the classical data processing device, in particular by the processor of the classical processing device.

The data processing system may comprise the quantum processing device, in particular the quantum annealing device. Alternatively, the quantum processing device may be separated from the data processing system.

At least one of the constraints, preferably all of the constraints, may be transferred to the quantum processing device, preferably from the classical processing device, in particular the memory of the classical processing device. Transferring the constraints may comprise transferring fixed values during optimization, for example, the output values of the cryptographic hash function.

The optimization variables may be assigned to a superposition of quantum states, and/or the optimizer may be a minimum, preferably a global minimum, of the optimization problem.

In particular, each possible value allocation of the optimization variables may correspond to one of the quantum states, preferably generated by the quantum processing device. At an initial time, each of the quantum states of the superposition may have the same weight. The superposition may be evolved in time by the quantum processing device according to a prescription determined from the constraints. The prescription may for example be represented by a Hamiltonian. The optimizing value (allocation) of the least one preimage variable may be determined from the superposition at a final time. At the final time, an optimizing quantum state of the quantum states, corresponding to the optimizing value allocation, may have the largest weight of the quantum states of the superposition. The optimizing quantum state may for example correspond to a ground state of the Hamiltonian.

The optimizing value of the least one preimage variable may be determined by determining the optimizing quantum state. The optimizing value may be transferred to the classical data processing device. With this, the preimage element may be provided in the classical data processing device, in particular in the memory of the classical processing device.

The cryptographic hash function may provide information security, preferably for authentication and/or data corruption detection. The cryptographic hash function may further be one of MD4, MD5, SHA-1, and SHA-2.

The preimage element may comprise a message and/or data file to be digitally signed and/or verified, preferably for data integrity and/or proof of work. With the proof of work, transactions in a blockchain may be confirmed and/or new blocks of the blockchain may be generated.

The aforementioned embodiments related to the method for determining a preimage element of a cryptographic hash function can be provided correspondingly for the data processing system configured to determine a preimage element of a cryptographic hash function.

DESCRIPTION OF EMBODIMENTS

In the following, embodiments, by way of example, are described with reference to the Figures, in which.

Figure 1:
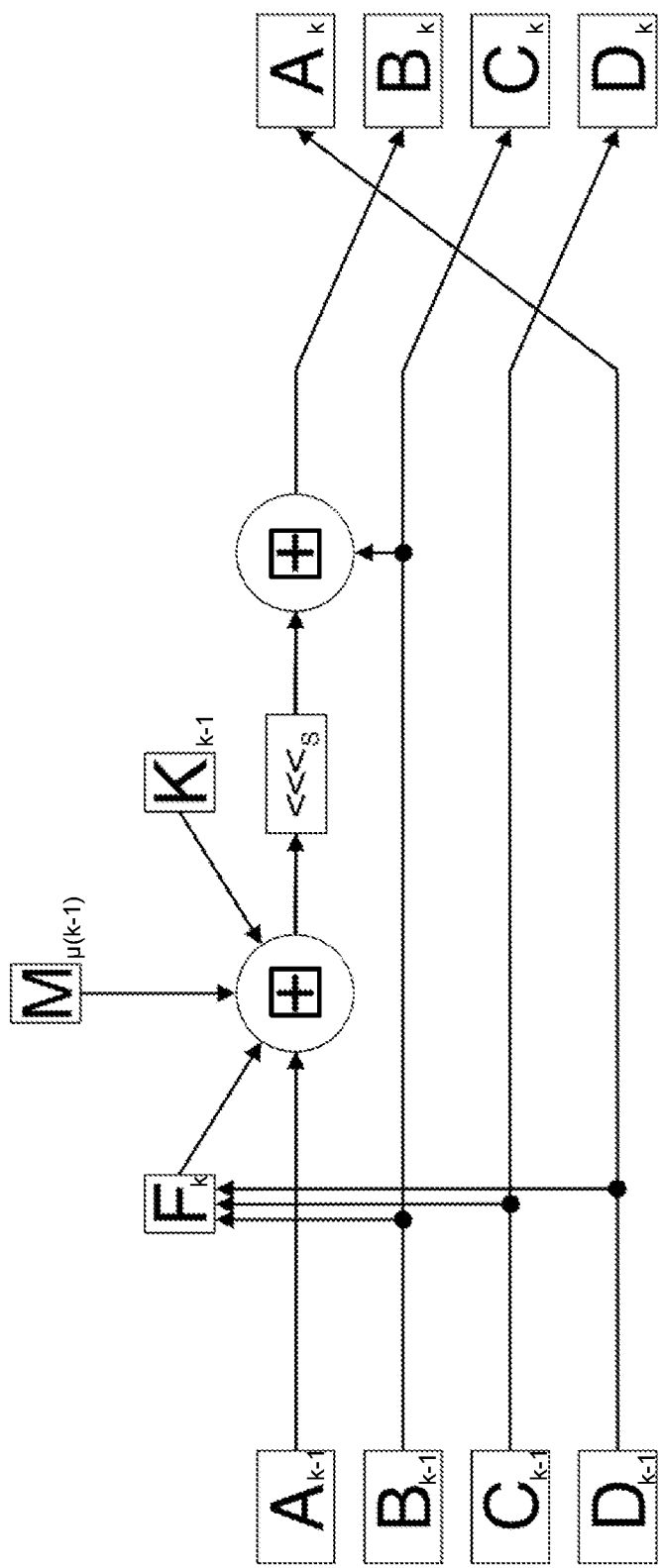
FIG. 1 shows a graphical representation of an MD5 hash function.

FIG. 1 shows a graphical representation of an MD5 hash function. The input data of the hash function, for example a message, is divided in message blocks (preimage data blocks) $M_k$ of fixed block length (in case of MD5: 32 bit) corresponding to different iterations k of the hash function. The hash function comprises internal states for each iteration k, each internal state consisting of four 32 bit blocks $A_k$, $B_k$, $C_k$, $D_k$.

Starting with in an initial internal state ($A_0$, $B_0$, $C_0$, $D_0$), hash function operations are applied to the initial internal state ($A_0$, $B_0$, $C_0$, $D_0$) within a first iteration, resulting in a first internal state ($A_1$, $B_1$, $C_1$, $D_1$), which in turn provides the starting point for a second iteration of applying hash function operations. The diagram shown in FIG. 1 illustrates the application of hash function operations for an iteration k. Within each iteration k, a message block $M_k$ is processed and used to modify the internal state. After reaching the maximum number of iterations (64 in case of MD5), the 32 bit blocks of the last internal state are concatenated, yielding the output value of the cryptographic hash function.

The MD5 hash function (as well as most of the widely used cryptographic hash functions such as MD4, SHA-1, and SHA-2) comprises the following hash function operations:
nonlinear Boolean functions $F_k$ based on bitwise logical operations,
addition of 16-, 32-bit integers modulo $2^{16}$ or $2^{32}$, and
shift of bit sequences by a number of bits.

The 64 iterations of the MD5 hash function are grouped in four rounds of 16 operations. For each round, a different Boolean function $F_k$ is employed. $K_k$ consists of a 32-bit constant and is different for each iteration k. The symbol <<<S denotes a left bit rotation by s places wherein s varies for each iteration. The symbol ⊞ denotes addition modulo $2^{32}$.

For the iteration k, starting with the internal state ($A_{k-1}$, $B_{k-1}$, $C_{k-1}$, $D_{k-1}$), in accordance with FIG. 1 the values of the internal state are processed as follows:

$$A_k = D_{k-1},$$

$$B_k = (F_k(B_{k-1}, C_{k-1}, D_{k-1}) + A_{k-1} + M_{\mu(k-1)} + K_{k-1}) <<< s_k + B_{k-1},$$

$$C_k = B_{k-1}, D_k = C_{k-1}. \quad (5)$$

The function $\mu$ is defined as $$\mu(k) = \begin{cases} 5k + 1 (\text{mod } 16)(k \in 16 \ldots 31) \\ k(k \in 0 \ldots 15) \\ 3k + 5 (\text{mod } 16)(k \in 32 \ldots 47) \\ 7k(k \in 48 \ldots 63) \end{cases} \quad (6)$$

The nonlinear Boolean functions $F_k$ are defined, depending on the iteration k, as $$F_k = \begin{cases} F(B, C, D) = (B \wedge C) \vee (!B \wedge D)(k \in 1 \ldots 16) \\ G(B, C, D) = (B \wedge D) \vee (C \wedge !D)(k \in 17 \ldots 32) \\ H(B, C, D) = B \oplus C \oplus D(k \in 33 \ldots 48) \\ I(B, C, D) = C \oplus (B \vee !D)(k \in 49 \ldots 64) \end{cases} \quad (7)$$

The first 16 iterations k constitute the first round, the subsequent 16 iterations the second round the third 16 iterations the third round, and the last 16 iterations the fourth and last round. The symbols $\Pi$, $\wedge$, $\oplus$ and ! denote the logical operations OR, AND, XOR, and NOT respectively. The variables B, C, and D are 32-bit words.

All $A_k$, $B_k$, $C_k$, $D_k$, $M_{\mu(k)}$, $K_k$ may be treated as 32-bit unsigned integers. $A_{64}$, $B_{64}$, $C_{64}$, $D_{64}$ are 32-bit blocks of the final hash value. $M_k$ with $k \in 0 \ldots 15$ constitute the input message to be determined and are employed as optimization variables (preimage variables). The variable y appearing in Eq. (1) and (2) is the union of the internal states/data blocks $A_{64}$, $B_{64}$, $C_{64}$, $D_{64}$.

Determining a preimage element x for given hash value y hence corresponds to determining the preimage variables $M_k$ for given $A_{64}$, $B_{64}$, $C_{64}$, $D_{64}$.

Figure 2:
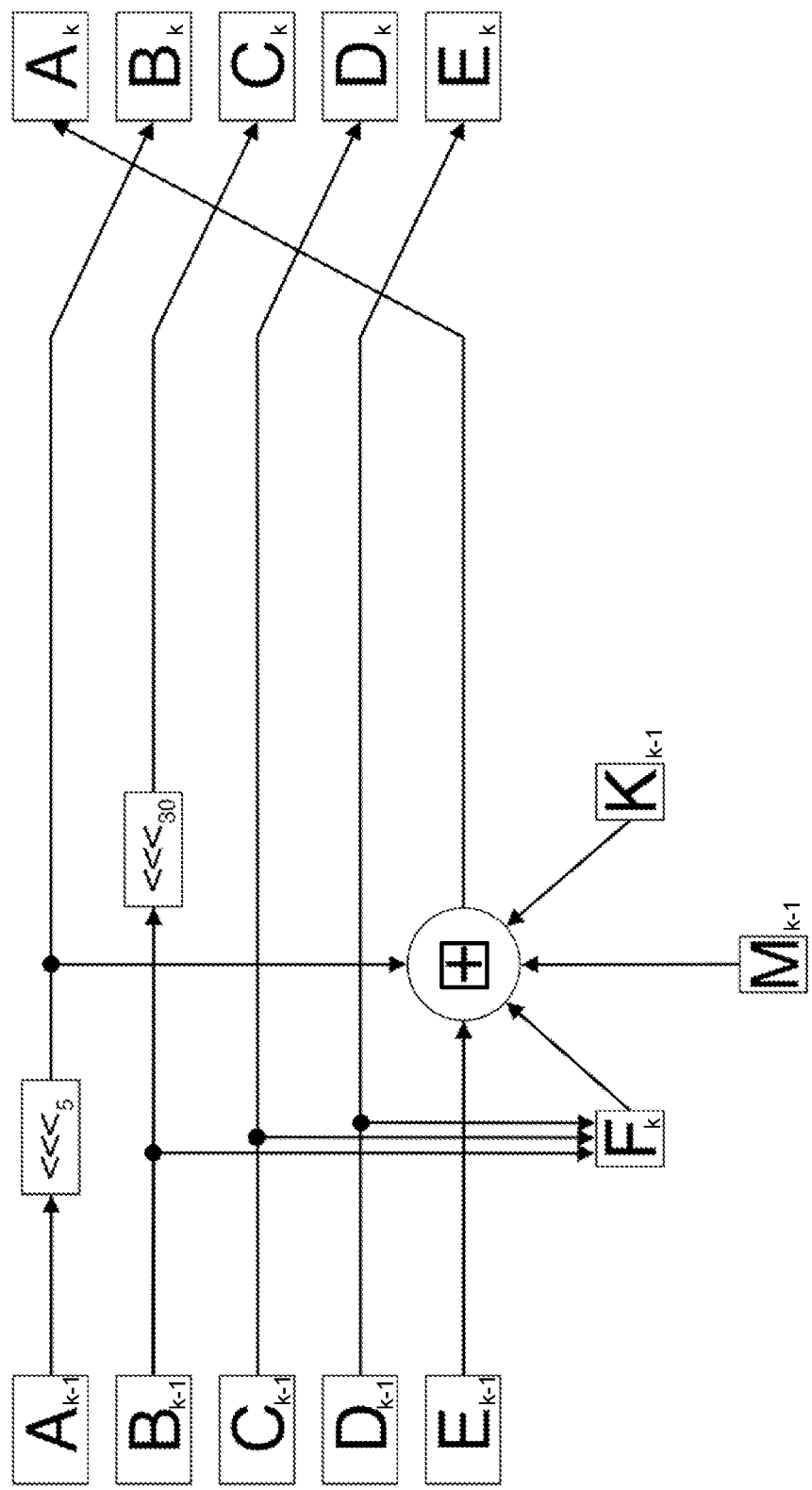
FIG. 2 shows a graphical representation of an SHA-1 hash function.

FIG. 2 is a corresponding graphical representation of an SHA-1 hash function, illustrating the application of hash function operations for an iteration k. The internal state for each iteration consists of five 32 bit data blocks $A_k$, $B_k$, $C_k$, $D_k$, $E_k$. $M_k$ denotes the message block of the iteration k and $K_k$ is the constant different for each iteration k.

The nonlinear Boolean functions $F_k$ used in MD5 and SHA-1 are defined as:

1. MD5, SHA1 $F(B,C,D)=(B \wedge C) \vee (!B \wedge D)$

2. MD5 $G(B,C,D)=(B \wedge D) \vee (C \wedge !D)$

3. MD5, SHA1 $H(B,C,D)=B \oplus C \oplus D$

4. MD5 $I(B,C,D)=C \oplus (B \wedge !D)$

5. SHA1 $J(B,C,D)=(B \wedge C) \vee (B \wedge D) \vee (C \wedge D)$ (8)

Although only two of the above Boolean functions are used in both MD5 and SHA-1, all Boolean functions are compositions of elementary Boolean operations on binary variables x and y: !x, $x \wedge y$, $x \vee y$, and $x \oplus y$.

On a bit level, the NOT operation just amounts to switching between 0 and 1, i.e., !1=0 and !1=0. The other three elementary operations are defined as follows (note that $\oplus$ corresponds to an addition modulo 2):

| x | y | $x \wedge y$ | $x \vee y$ | $x \oplus y$ |
|---|---|---|---|---|
| 0 | 0 | 0 | 0 | 0 |
| 0 | 1 | 0 | 1 | 1 |
| 1 | 0 | 0 | 1 | 1 |
| 1 | 1 | 1 | 1 | 0 |

The left bit rotation operation and the addition modulo operation may be represented by the following formulas. A left shift rotation y for an N bit number x by s places is defined as $$y = x <<<_s := (x << s) | (x >> (N-s)) = x \cdot 2^s \mod 2^N + x // 2^{N-s},$$

where the symbol "//" denotes the floor division and the symbols "<<" and ">>" denote left shift and right shift, respectively. A right shift rotation is defined as $y = x >>>_s = (x >> s) | (x << (N-s)) = x // 2^s + x \cdot 2^{N-s} \mod 2^N$. Addition modulo $2^N$ means addition followed by calculating the remainder after division by $2^N$.

a. Method for Determining a Preimage Element

If the left hand side and right hand side of Eq. (2), H ({x, $x_{fixed}$}) $\leq$ y, are represented in binary notation, then Eq. (2) holds if and only if a number $n_Z$ (predefined by the value of y) of leading bits of H({x, $X_{fixed}$}) are equal to 0. The greater $n_Z$, the more difficult it is to determine a preimage element x that satisfies Eq. (2). Denoting by $(b)_k$ the k-th bit in a (binary) finite sequence b, Eq. (2) can be formulated in the following equation system:

$$(H(\{x, x_{fixed}\}))_k = 0, k = 1, \ldots, n_Z. \quad (9)$$

Eq. (1), H(x)=y, and Eq. (9) may be further reformulated as mixed-integer programming problems with binary variables, in particular mixed-integer linear programming problems (MILP) with constraints comprising linear equations and/or linear inequalities as constraints.

Eq. (1) and (9) may also be formulated as quadratic unconstrained binary optimization problems (QUBO) with bilinear functions and without additional constraints on the feasible values of the binary variables. Both MILP and QUBO may be solved using available classical solvers (e.g., CPLEX, Gurobi, XPRESS or SCIP), but also solving in a quantum processing device is possible. In particular, QUBO may be solved employing quantum annealing devices such as D-Wave. Since QUBO may comprise a discrete search space comprising all possible value allocations of the optimizing variables, the possible value allocations may be processed in parallel (quantum parallelism), a substantial speedup in determining preimage elements can be achieved.

Any noticeable acceleration of solving equation systems such as in Eq. (1) and (9) will provide a major increase particularly in the performance of systems relying on data integrity or proof of work, such as blockchain systems. Currently, a time limit of ten minutes is allowable for nonce searches. Particularly within this context, quantum annealing devices may help to reduce the required computation time to a few seconds.

Figure 3:
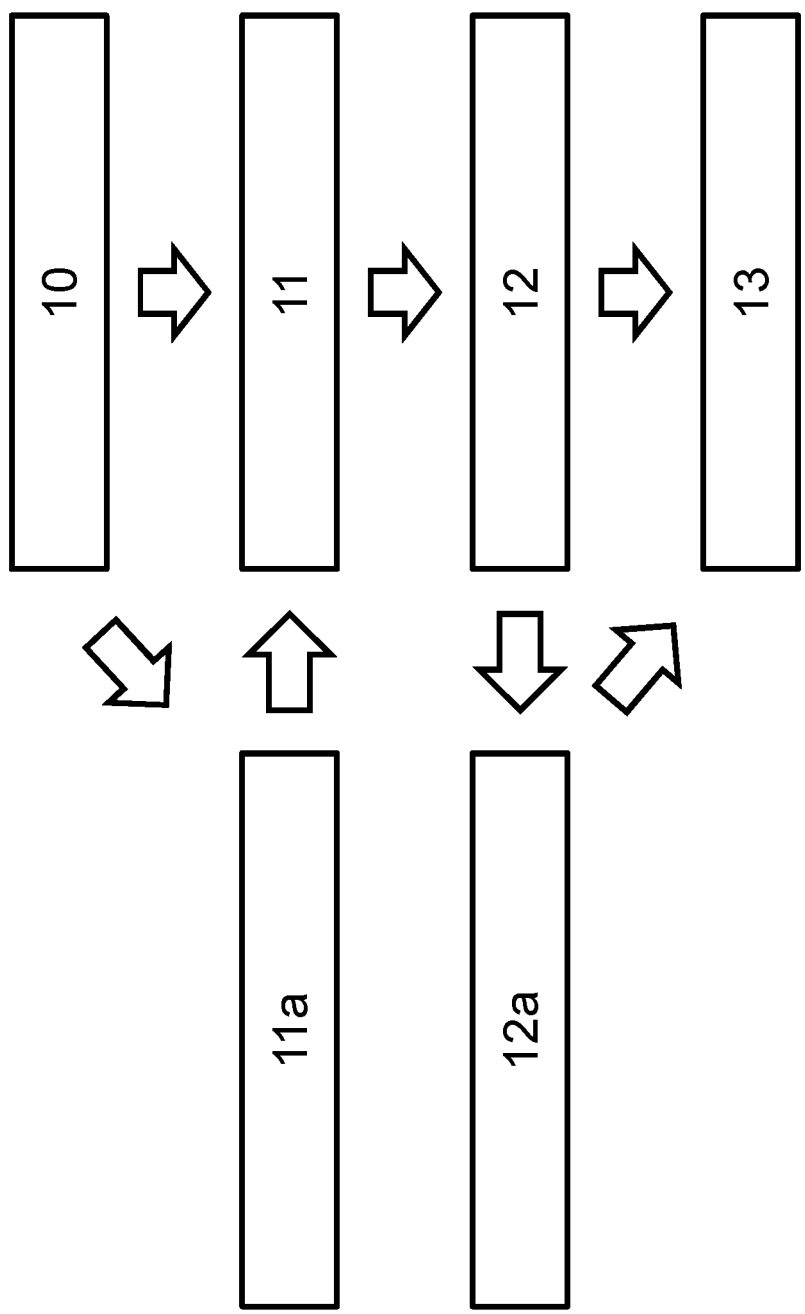
FIG. 3 shows a graphical representation of a method for determining a preimage element of a cryptographic hash function.

FIG. 3 shows a graphical representation of a method for determining a preimage element of a cryptographic hash function, carried out in a data processing system.

In a first step 10, the hash function operations F, . . . , J as defined in Eq. (8) of the cryptographic hash function (such as MD5 or SHA-1) are provided. For each of the hash function operations F, . . . , J, one corresponding hash function relation or a plurality of corresponding hash function relations are determined (step 11). Each hash function relation can be an equation. Alternatively, the plurality of corresponding hash functions can be a set of inequalities. The equations can be determined by solving auxiliary (initial) optimization problems, preferably of lower dimension.

The hash function relations are determined directly from the hash function operations or via an optional intermediate step 11*a*. In step 11*a*, the constituting elementary operations comprising NOT, AND, OR, and/or XOR of the hash function operations F, . . . , J are determined and for each of the elementary operations, a corresponding elementary equation and/or set of elementary inequalities is determined.

After determining the hash function relations, an optimization problem such as a MILP a QUBO is determined (step 12). The optimization problem comprises a set of optimization equations or optimization inequalities (constraints) for each iteration of the hash function established from the hash function relations. The optimization problem further comprises the internal states of the hash function (($A_i$, $B_i$, $C_i$, $D_i$) in case of MD5 and ($A_i$, $B_i$, $C_i$, $D_i$, $E_i$) in case of SHA-1) and the preimage variables $M_i$ as optimization variables. The initial internal state ($A_0$, $B_0$, $C_0$, . . . ) and the final internal state (corresponding to the resulting hash value) are known and kept fixed during optimization. The constraints assigned to a certain iteration comprise the internal state variables assigned to the preceding iteration.

In an optional step 12*a*, the number of constraints and/or optimization variables may be reduced. This may be achieved via presolving the constraints and/or optimization variables.

After determining the optimization problem, the optimization problem is solved and the preimage element of the hash function is determined from an optimizing set of optimization variables (optimizer) of the optimization problem (step 13).

Figure 4:
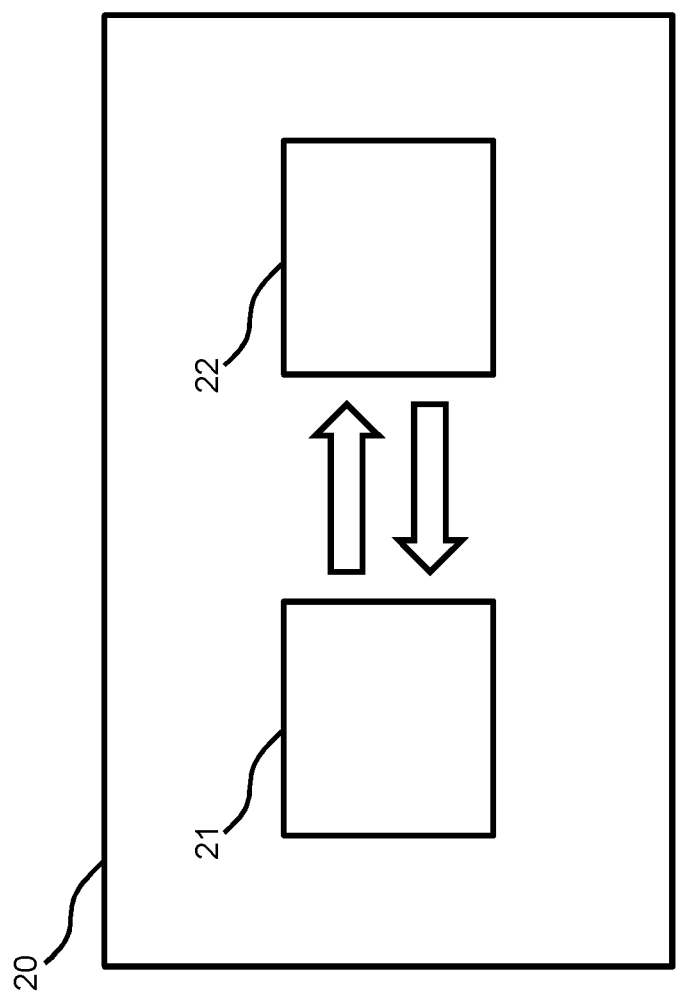
FIG. 4 shows a graphical representation of a data processing system.

FIG. 4 shows a graphical representation of a data processing system 20. The data processing system 20 comprises a classical processing device 21. Additionally, the data processing system 20 may comprise a quantum processing device 22, for example a quantum annealing device. Data may be exchanged between the classical processing device 21 and the quantum processing device 22. In particular, in case of employing a D-Wave quantum annealing device, a D-Wave Python API may be used for data exchange. Steps 10 to 12 are preferably carried in out in the classical processing device 21. Step 13 may also be carried out in the classical processing device 21. However, step 13 is significantly accelerated when the optimization problem is solved in the quantum processing device 22.

b. Determining the Elementary Relations for the Elementary Operations

Determining the elementary relations according to step 11*a*, comprises establishing an (elementary) equation or a set of inequalities for each of the elementary operations ! x=y, x∧y=z, x∨y=z, and x⊕y=z.

Consider reduction of equations with basic boolean functions to MILP constraints.

The NOT operation corresponds for binary variables x, y to an equation comprising a subtraction operation, resulting in the following equivalence:

$$!x = y \Leftrightarrow y = 1-x. \tag{10}$$

More generally, in order to determine a linear equation system corresponding to one of the other elementary operations (which are Boolean functions), a respective initial optimization problem is solved. In the following, $\vec{x}$ is defined as joint vector $\vec{x}=(\vec{y}, q(\vec{y}))$ for elementary operation q, set of input variables $\vec{y}$, and output $q(\vec{y})$. Further, $f$ denotes a set of feasible configurations. The equation to be determined has the form $$\vec{c}^T\vec{x} + \vec{e}^T\vec{a} = b, \tag{11}$$

wherein $\vec{a}$ is an auxiliary vector of binary coefficients, b is a continuous coefficient, $\vec{c}$, $\vec{e}$ are vectors of continuous coefficients, and $\vec{x}=(\vec{y}, q(\vec{y}))$ is a vector of binary variables. The transpose of a vector is denoted with $(\bullet)^T$. Notably, Eq. (11) is linear in $\vec{c}$.

The linear system must satisfy:

$$\begin{cases} \vec{c}^T\vec{x} + \vec{e}^T\vec{a}_x = b (\forall x \in f) \\ \vec{c}^T\vec{x} + \vec{e}^T a \neq b (\forall x \notin f \forall \vec{a} \in \{0,1\}^{N_a}) \end{cases} \tag{12}$$

The sought-after coefficients to be determined by the initial optimization problem are the continuous variables $\vec{c}$, $\vec{e}$, and b. The initial optimization problem can be formulated as a MILP and is determined from Eq. (12) as follows. First, a number $N_a$ of ancillaries $\vec{a}$ in Eq. (12) is chosen. The number of variables in the original problem is denoted with $N_x$. The MILP consists of a set of auxiliary constraints and an objective function. Each vector from the feasible configurations yields one of the auxiliary constraints with continuous variables $\vec{c}$, $\vec{e}$, and b and $N_a$ new binary variables $\vec{a}$:

$$\vec{c}^T\vec{x} + \vec{e}^T\vec{a} = b \tag{13}$$

For each vector $\vec{x}$ from the infeasible configurations, $2^{N_a}$ new of the auxiliary constraints are added:

$$\forall \vec{a} \in \{0,1\}^N: \vec{c}^T\vec{x} + \vec{e}^T\vec{a} \neq b \tag{14}$$

The number of auxiliary constraints grows exponentially but most popular hash functions have functions only with small number of input and output variables. It included MD- and SHA-hash functions. We do not account summation, because we invented corresponding linear equations for that.

As a result, a MILP with $|f|+2^{N_a}|f^*|$ auxiliary constraints ($|f|$ and $|f^*|$ being the number of the feasible and the infeasible configurations, respectively) and $N_x+N_a+1+|f| N_a$ variables is established. Such a homogeneous MILP has many solutions (multiplying all coefficients by the same number also results in a solution). Hence, the first coefficient $c_1$ of $\vec{c}$ is set to 1, yielding the additional auxiliary constraint or corresponding penalty term $c_1=1$.

The initial optimization problem then reads:

$$\min_{\vec{a}_x, b, \vec{c}, \vec{e}} (c_1 - 1)^2 \text{ subject to} \begin{cases} \vec{c}^T\vec{x} + \vec{e}^T\vec{a}_x = b (\forall x \in f) \\ \vec{c}^T\vec{x} + \vec{e}^T a \neq b (\forall x \notin f \forall \vec{a} \in \{0,1\}^{N_a}) \end{cases}. \tag{15}$$

with b, $\vec{c}$, $\vec{e}$ comprising real-valued variables and $\vec{a}_x$ comprising binary variables. As an example, determining the elementary equation for the elementary operation z=x∧y is described below. The feasible configurations and the infeasible configurations of the operations are as follows:

| x | y | z |  |
|---|---|---|---|
| 0 | 0 | 0 | feasible |
| 0 | 1 | 0 | feasible |
| 1 | 0 | 0 | feasible |
| 1 | 1 | 1 | feasible |
| 0 | 0 | 1 | infeasible |
| 0 | 1 | 1 | infeasible |
| 1 | 0 | 1 | infeasible |
| 1 | 1 | 0 | infeasible |

Eq. (13) is simplified to $c_x x + c_y y + c_z z + c_a a = b$ and the coefficients $c_x$, $c_y$, $c_z$, $C_a$, $b$ are to be determined such that:

$$z = x \wedge y \Leftrightarrow (\exists a \in \{0,1\} : c_x x + c_y y + c_z z + c_a a = b). \tag{16}$$

The initial optimization problem then reads $$\min_{c_x, c_y, c_z, c_a, b, a_0, a_1, a_2, a_3} (c_x - 1)^2$$

subject to:

$c_x \cdot 0 + c_y \cdot 0 + c_z \cdot 0 + C_a a_0 = b,$ $c_x \cdot 0 + c_y \cdot 1 + c_z \cdot 0 + c_a a_1 = b$ $c_x \cdot 1 + c_y \cdot 0 + c_z \cdot 0 + c_a a_2 = b$ $c_x \cdot 1 + c_y \cdot 1 + C_z \cdot 1 + C_a a_3 = b$ $c_x \cdot 0 + c_y \cdot 0 + c_z \cdot 1 + c_a \cdot 0 \neq b,$ $c_x \cdot 0 + c_y \cdot 0 + c_z \cdot 1 + c_a \cdot 1 \neq b,$ $c_x \cdot 0 + c_y \cdot 1 + c_z \cdot 1 + c_a \cdot 0 \neq b,$ $c_x \cdot 0 + c_y \cdot 1 + c_z \cdot 1 + c_a \cdot 1 \neq b,$ $c_x \cdot 1 + c_y \cdot 0 + c_z \cdot 1 + c_a \cdot 0 \neq b,$ $c_x \cdot 1 + c_y \cdot 0 + c_z \cdot 1 + c_a \cdot 1 \neq b,$ $c_x \cdot 1 + c_y \cdot 1 + c_z \cdot 0 + c_a \cdot 0 \neq b,$ $c_x \cdot 1 + c_y \cdot 1 + c_z \cdot 0 + c_a \cdot 1 \neq b,$ $$c_x, c_y, c_z, c_{\{a\}}, b \in \mathbb{R}, a_0, a_1, a_2, a_3 \in \{0,1\}. \tag{17}$$

The above initial optimization problem may be directly passed to state-of-the-art solvers (such as CPLEX), or may be converted into a classic MINLP (without inequality constraints) or to an MILP.

The optimization problem yields for the elementary operation $z = x \wedge y$ the following elementary equation with ancillary variable a:

$$x + y - 2z - a = 0 \tag{18}$$

Eq. (18) is equivalent to $z = x \wedge y$ in the sense that the triple of binary variables x, y, z satisfies $z = x \wedge y$ if and only if there exists a binary a such that Eq. (18) holds. This holds as can be seen by the following table (zeros in bold point to feasible triples of x, y, z):

| x | y | z | a | x + y − 2z − a |
|---|---|---|---|---|
| 0 | 0 | 0 | 0 | 0 |
| 0 | 0 | 0 | 1 | −1 |
| 0 | 0 | 1 | 0 | −2 |
| 0 | 0 | 1 | 1 | −3 |

-continued

| x | y | z | a | x + y − 2z − a |
|---|---|---|---|---|
| 0 | 1 | 0 | 0 | 1 |
| 0 | 1 | 0 | 1 | 0 |
| 0 | 1 | 1 | 0 | −1 |
| 0 | 1 | 1 | 1 | −2 |
| 1 | 0 | 0 | 0 | 1 |
| 1 | 0 | 0 | 1 | 0 |
| 1 | 0 | 1 | 0 | −1 |
| 1 | 0 | 1 | 1 | −2 |
| 1 | 1 | 0 | 0 | 2 |
| 1 | 1 | 0 | 1 | 1 |
| 1 | 1 | 1 | 0 | 0 |
| 1 | 1 | 1 | 1 | −1 |

Instead of representing $z = x \wedge y$ by an equation, the elementary operation can also be represented by a set of inequalities:

$$z \leq x, z \leq y, z \geq x + y - 1. \tag{19}$$

Importantly, if x, y are binary and if z satisfies Eq. (19), then z can take only distinct values 0 and 1 without explicitly requiring z to be binary. With this, the complexity of MILP representations of preimage and/or mining problems may be reduced.

Correspondingly, the further elementary operation OR with $$x \vee y = z \tag{20}$$

yields the following elementary equation:

$$x + y - 2z + a = 0. \tag{21}$$

This can be verified via the following table:

| x | y | z | a | x + y − 2z + a |
|---|---|---|---|---|
| 0 | 0 | 0 | 0 | 0 |
| 0 | 0 | 0 | 1 | 1 |
| 0 | 0 | 1 | 0 | −2 |
| 0 | 0 | 1 | 1 | −1 |
| 0 | 1 | 0 | 0 | 1 |
| 0 | 1 | 0 | 1 | 2 |
| 0 | 1 | 1 | 0 | −1 |
| 0 | 1 | 1 | 1 | 0 |
| 1 | 0 | 0 | 0 | 1 |
| 1 | 0 | 0 | 1 | 2 |
| 1 | 0 | 1 | 0 | −1 |
| 1 | 0 | 1 | 1 | 0 |
| 1 | 1 | 0 | 0 | 2 |
| 1 | 1 | 0 | 1 | 3 |
| 1 | 1 | 1 | 0 | 0 |
| 1 | 1 | 1 | 1 | 1 |

With regard to a set of (elementary) inequalities, the elementary operation OR is represented as $$x \leq z, y \leq z, z \leq x + y, z \leq 1 \tag{22}$$

If x, y are again binary and if z satisfies Eq. (22), then z can take only the distinct values 0 and 1 without explicitly requiring that z be binary.

In case of the elementary relation XOR with $$x \oplus y = z, \tag{23}$$

the corresponding elementary equation reads $$x + y - z - 2a = 0, \tag{24}$$

which can be verified by the following table:

| x | y | z | a | x + y − z − 2a |
|---|---|---|---|---|
| 0 | 0 | 0 | 0 | 0 |
| 0 | 0 | 0 | 1 | −2 |
| 0 | 0 | 1 | 0 | −1 |
| 0 | 0 | 1 | 1 | −3 |
| 0 | 1 | 0 | 0 | 1 |
| 0 | 1 | 0 | 1 | −1 |
| 0 | 1 | 1 | 0 | 0 |
| 0 | 1 | 1 | 1 | −2 |
| 1 | 0 | 0 | 0 | 1 |
| 1 | 0 | 0 | 1 | −1 |
| 1 | 0 | 1 | 0 | 0 |
| 1 | 0 | 1 | 1 | −2 |
| 1 | 1 | 0 | 0 | 2 |
| 1 | 1 | 0 | 1 | 0 |
| 1 | 1 | 1 | 0 | 1 |
| 1 | 1 | 1 | 1 | −1 |

The XOR operation can also be represented by the set of inequalities $z \leq x+y,$ $z \geq x-y,$ $z \geq y-x,$ $z \leq 2-x-y.$ (25)

As described above, if a continuous variable z satisfies Eq. (25) with binary x and y, it can nevertheless only assume the values 0 and 1.

c. Determining the Hash Function Relations

The hash function relations as determined in step 11 can, analogous to the elementary relations, be equations or inequalities. In the case of equations, the equations can be determined by solving an initial optimization problem with a form as in Eq. (15). Alternatively, the sets of inequalities can be determined from the sets of inequalities corresponding to the elementary operations that constitute the respective hash function operation.

In case of the hash function operation F (see Eq. (8.1)) with $F(x,y,z)=(x \wedge y) \vee (!x \wedge z),$ (26)

and x, y, z corresponding to mutual bits from the 32-bit words B, C, and D, the following equation is determined:

$x+3y+2z-6F'+2a_0-3a_1+2a_2=0,$ (27)

with binary variable F' and binary ancillary variables $a_0$, $a_1$, and $a_2$. For determining the set of inequalities for the hash function operation from the elementary inequalities, Eq. (26) is reformulated as $F(u_F,v_F)=u_F \vee v_F$ (28)

with continuous ancillary variables $u_F=(x \wedge y)$ and $v_F=(!x \wedge z)$, which however will actually take binary values only. The set of inequalities for the hash function operation F then is determined as:

$u_F \leq x, u_F \leq y, u_F \geq x+y-1,$ $v_F \leq 1-x, v_F \leq z, v_F \geq z-x, v_F \geq 0,$ $v_F \leq F', u_F \leq F', F' \leq u_F+v_F, F' \leq 1,$ (29)

with binary variable F'. Eq. (27) and Eq. (29) can respectively be employed for determining constraints in the optimization problem, preferably a MILP.

In case of the hash function operation G with $G(x,y,z)=(x \wedge z) \vee (y \wedge !z),$ (30)

and x, y, z corresponding to mutual bits from the 32-bit words B, C, and D, the following equation is determined:

$3x+2y-z-6G'-3a_0+2a_1+2a_2=0,$ (31)

with binary variable G' and binary ancillary variables $a_0$, $a_1$, and $a_2$. For determining the set of inequalities for the hash function operation from the elementary inequalities, Eq. (30) is reformulated as $G(u_G,v_G)=u_G \vee v_G$ (32)

with continuous ancillary variables $U_G=(x \wedge z)$ and $V_G=(y \wedge ! Z)$, taking binary values. The set of inequalities for the hash function operation G then is determined as:

$u_G \leq x, u_G \leq z, u_G \geq x+z-1,$ $v_G \leq 1-z, v_G \leq y, v_G \geq y-z, v_G \geq 0,$ $v_G \leq G', u_G \leq G', G' \leq u_G+v_G, G' \leq 1,$ (33)

with binary variable G'.

In case of the hash function operation H (see Eq. (8.3)) with $H(x,y,z)=x \oplus y \oplus z,$ (34)

and x, y, z corresponding to mutual bits from the 32-bit words B, C, and D, the following equation is determined:

$x+y+z-H'-2a=0,$ (35)

with binary variable H' and binary ancillary variable a. For determining the set of inequalities for the hash function operation from the elementary inequalities, Eq. (34) is reformulated as $H(u_H,z)=u_H \oplus z$ (36)

with continuous ancillary variable $u_H=x \oplus y$, taking binary values. The set of inequalities for the hash function operation H then is determined as:

$u_H \leq x+y, H' \leq u_H+z,$ $u_H \geq x-y, H' \geq u_H-z,$ $u_H \geq y-x, H' \geq z-u_H,$ $u_H \leq 2-x-y, H' \leq 2-u_H-z,$ (37)

with binary variable H'.

In case of the hash function operation I with $I(x,y,z)=y \oplus (x \vee !z),$ (38)

and x, y, z corresponding to mutual bits from the 32-bit words B, C, and D, the following equation is determined:

$x+2y-z-2I'+a_0-4a_1=0,$ (39)

with binary variable I' and binary ancillary variables $a_0$ and $a_1$. For determining the set of inequalities for the hash function operation I from the elementary inequalities, Eq. (38) is reformulated as $I(u_I,y)=y \oplus u_I$ (40)

with continuous ancillary variable $u_I=x \vee ! z$, taking binary values. The set of inequalities for the hash function operation I then is determined as:

$x \leq u_I, 1-z \leq u_I, u_I \leq x-z+1, u_I \leq 1.$ $I' \leq y+u_I, I' \geq y-u_I, I' \geq u_I-y, I' \leq 2-y-u_I,$ (41)

with binary variable I'.

In case of the hash function operation j with $$J(x,y,z)=(x\wedge y)\vee(x\wedge z)\vee(y\wedge z), \quad (42)$$

and x, y, z corresponding to mutual bits from the 32-bit words B, C, and D, the following equation is determined:

$$x+y+z-2J'-a=0, \quad (43)$$

with binary variable J' and binary ancillary variable a. For determining the set of inequalities for the hash function operation j from the elementary inequalities, Eq. (42) is reformulated as $$J(u_j,v_j)=u_j\vee v_j \quad (44)$$

with continuous ancillary variables $p_j=(x\wedge y)$, $q_j=(x\wedge z)$, $u_j=(p_j\vee q_j)$, and $v_j=(y\wedge z)$, taking binary values. The set of inequalities for the hash function operation j then is determined as:

$$p_j\leq x, p_j\leq y, p_j\geq x+y-1,$$

$$q_j\leq x, q_j\leq z, q_j\geq x+z-1,$$

$$v_j\leq y, v_j\leq z, v_j\geq y+z-1,$$

$$p_j\leq u_j, q_j\leq u_j, u_j\leq p_j+q_j, u_j\leq 1,$$

$$u_j\leq J', v_j\leq J', J'\leq u_j+v_j, J'\leq 1. \quad (45)$$

with binary variable J'. Eq. (43) and Eq. (45) can respectively be employed for determining constraints in the optimization problem, preferably a MILP.

In case of the hash function operation being the shift operation acting on a linear equation system $\vec{\Phi}(\vec{x},\vec{y})=\vec{b}$, where $\vec{x}, \vec{y}$ are vectors of variables and $\vec{b}$ is a fixed vector of parameters (constant during optimization), merely a renaming of corresponding variables takes place. Denoting with $\vec{x}'$ the shifted vector $\vec{x}=(x_1, x_2, \ldots, x_N)$, then $\vec{x}'=(x_{s+1}, x_{s+2}, \ldots, x_N, x_1, x_2, \ldots, x_s)$ in case of right rotation (x'=x>>>s) and $\vec{x}'=(x_{N-s}, x_{N-s+1}, \ldots, x_N, x_1, x_2, \ldots, x_{N-s-1})$ in case of left rotation (x'=x<<<s). Hence, the linear equation system after applying the shift operation is just another re-indexed linear equation system $\vec{\Phi}'(\vec{x},\vec{y})=\vec{\Phi}(\vec{x}',\vec{y}')=\vec{b}$.

In case of the hash function operation being the addition modulo operation, acting on $a_i \in \mathbb{Z}$, i.e., $$\sum_{i=0}^{K} a_i = b\,(\mathrm{mod}\,2^N) \quad (46)$$

with summand $b\in\mathbb{Z}$, each bit place in Eq. (46) is to be considered. Expanding $a_i=\Sigma_{j=0}^K a_{ij}\,2^j$ and $b=\Sigma_{j=0}^K b_j\,2^j$ with $a_{ij}$, $b_j$ being the j-th bit of $a_i$ and b, respectively, Eq. (46) is equivalent to:

$$\sum_{i=0}^{N} a_{i0} = b_0 + \sum_{i=0}^{C_0} \xi_{i,0} 2^i \quad (47)$$

$$\sum_{i=0}^{1-1} \xi_{C_i-1,i} + \sum_{i=0}^{N} a_{i1} = b_1 + \sum_{i=0}^{C_1} \xi_{i,1} 2^i$$

$$\sum_{i=0}^{2-1} \xi_{C_i-1,i} + \sum_{i=0}^{N} a_{i2} = b_2 + \sum_{i=0}^{C_2} \xi_{i,2} 2^i$$

$$\sum_{i=0}^{K-1} \xi_{C_i-1,i} + \sum_{i=0}^{N} a_{iK} = b_K + \sum_{i=0}^{C_K} \xi_{i,K} 2^i,$$

where $C_i$ is the number of carry bits for the i-th bit of $a_i$ and b.

Starting from the determined hash function equations for MILP constraints for the hash function operations F, G, H, I, and J, corresponding QUBO penalty terms can be determined, namely $$Q_F(F,B,C,D,A_0,A_1)=-2BC+2BD+4BF+4BA_0+4BA_1-$$
$$4CF-4CA_0+4DA_1+4FA_0+4FA_1-4B+4C-2D-2F-$$
$$4A_1+4$$

$$Q_G(G,B,C,D,A_0,A_1)=2BD-4BG+4BA_0-2CD-4CG+$$
$$4CA_1+4DA_0-4DA_1-4GA_0-4GA_1+2C+6G+4A_1$$

$$Q_H=(H,B,C,D,A_0,A_1)=4BD-4BA_0-4BA_1-4CH-$$
$$4CA_a+4CA_1-4DA_0-4DA_1+4HA_0-4HA_1+2B+$$
$$2C+2D+2H+4A_0+4A_1$$

$$Q_I=(I,B,C,D,A_0,A_1)=-2BD+4BA_0+4BA_1+4CI+4CA_0-$$
$$4CA_1-4DA_0-4DA_1+4IA_0-4A_1-2C+2D-2I+$$
$$8A_1+2$$

$$Q_J(J,B,C,D)=2BC+2BD-4BJ+2CD-4CJ-4DJ+6J \quad (48)$$

The QUBO-penalties in Eq. (48) do not necessarily result in a more efficient optimization than those obtained directly by squaring the corresponding determined hash function equations in MILP form. The above QUBO-penalties may, e.g., comprise more binary ancillary variables.

In general, additional binary variables should be avoided since the more discrete variables, the larger the size of potentially employed branch-and-bound algorithm search trees.

On the other hand, state-of-the-art MILP-solvers may admit thousands of continuous variables without noticeable loss of performance.

Further, when employing a set of inequalities instead of one equation for one hash function operation, there are different alternative ways of creating viable sets of inequalities.

d. Determining the Optimization Problem

Subsequently to determining the hash function relations, the optimization problem is determined according to step 12. To this end, the hash function relations within each one of the iterations of the cryptographic hash function are combined in correspondence with their (chronological) order when computing a hash value as illustrated in FIG. 1 or 2.

For MD5 and when using equations as hash function relations, starting with data blocks (internal state variables) $B_0$, $C_0$, and $D_0$ of the initial internal state, the first constraint of the optimization problem, $$L_1(B_0,C_0,D_0,F_1,\vec{\alpha}_1)=0, \quad (49)$$

is determined by inserting $B_0$, $C_0$, $D_0$, $F_1$ and ancillary variable vector $\vec{\alpha}_1$ into the equation for the hash function operator (of the first round) F for the variables x, y, z, F', and $(a_0, a_1, a_2)$, respectively in Eq. (27). Subsequently, in accordance with FIG. 1, the modular additions of $F_1=F(B_0, C_0, D_0)$ with the preimage variable $M_{\mu(1)}$ and constant $K_1$ are carried out. Inserting $F_1$, $M_{\mu(1)}$, and $K_1$ into the corresponding hash function relation in Eq. (47) and arranging all terms on the left hand side of the equation, the constraint $$\Sigma(F_1, A_0, M_{\mu(1)}, K_1, FM_1, \xi_{1,1}) = 0 \quad (50)$$

with ancillary variable $\xi_{1,1}$ is determined. Following this, the resulting term $FM_1$ is shifted and added to $B_0$, yielding the constraint $$\Sigma(FM_1 <<<_{s_1}, B_0, B_1, \xi_{1,2}) = 0 \quad (51)$$

with ancillary variable $\xi_{1,2}$. The resulting term of the modular addition corresponds to the internal state variable $B_1$ assigned to the next iteration. Further constraints are determined in order to represent assigning the internal state variables $B_0$, $C_0$, and $D_0$ to the respective internal state variables $C_1$, $D_1$, and $A_1$ assigned to the next iteration.

In summary, the following constraints assigned to the first iteration are determined:

$$\begin{cases} L_1(B_0, C_0, D_0, F_1, \vec{a}_1) = 0 \\ \Sigma(F_1, A_0, M_{\mu(1)}, K_1, FM_1, \xi_{1,1}) = 0 \\ \Sigma(FM_1 << <_{s_1}, B_0, B_1, \xi_{1,2}) = 0 \\ A_1 = D_0, C_1 = B_0, D_1 = C_0 \end{cases} \quad (52)$$

The constraints assigned to the subsequent iterations are determined analogously, resulting in the following set of constraints (here optimization equations):

$$\begin{cases} L_1(B_0, C_0, D_0, F_1, \vec{a}_1) = 0 \\ \Sigma(F_1, A_0, M_{\mu(1)}, K_1, FM_1, \xi_{1,1}) = 0 \\ \Sigma(FM_1 << <_{s_1}, B_0, B_1, \xi_{1,2}) = 0 \\ A_1 = D_0, C_1 = B_0, D_1 = C_0 \\ L_k(B_{k-1}, C_{k-1}, D_k - 1, F_k, \vec{a}_k) = 0 \\ \Sigma(F_k, A_{k-1}, M_{\mu(1)}, K_k, FM_k, \xi_{k,1}) = 0 \\ \Sigma(FM_k << <_{s_k}, B_{k-1}, B_k, \xi_{k,2}) = 0 \\ A_k = D_{k-1}, C_k = B_{k-1}, D_k = C_{k-1} \\ L_{64}(B_{63}, C_{63}, D_{63}, F_{64}, \vec{a}_{64}) = 0 \\ \Sigma(F_{64}, A_{63}, M_{\mu(64)}, K_{64}, FM_{64}, \xi_{64,1}) = 0 \\ \Sigma(FM_{64} << <_{s_{64}}, B_{63}, B_{64}, \xi_{64,2}) = 0 \\ A_{64} = D_{63}, C_{64} = B_{63}, D_{64} = C_{63} \end{cases} \quad (53)$$

Eq. (53) results in a constraint satisfaction problem (CSP) in which a feasible solution is to determined that satisfies all constraints in Eq. (53). Notably, $A_{64}$, $B_{64}$, $C_{64}$, $D_{64}$, are parts of the hash value y and $M_k$ for k=1, . . . , 16 are parts of the argument of the hash function (the preimage element).

In general, the variables $A_0$, $B_0$, $C_0$, $D_0$, $A_{64}$, $B_{64}$, $C_{64}$, $D_{64}$, and $K_k$ for k=1, . . . , 64 are known and fixed during optimization. The remaining variables constitute the optimization variables.

In the case of optimization equations, all $M_k$ are unknown in advance and $A_{64}$, $B_{64}$, $C_{64}$, $D_{64}$ are fixed.

In case of optimization inequalities (cf. Eq. (9)), some of the $M_k$ (e.g. k=3, . . . , 16) are fixed and only the remaining ones (e.g., $M_1$, $M_2$) are unknown variables. Further, when treating each of $A_{64}$, $B_{64}$, $C_4$, $D_{64}$ as finite sequences, e.g. $A_{64}$ is fixed to a zero bit-sequence and the remaining variables may take arbitrary values.

The optimization problem, a MILP with the constraints (Eq. (53)), is then solved, yielding optimal values for the optimization variables. The optimal values for the message blocks $M_k$ constitute one of the preimage elements of the cryptographic hash function MD5. For SHA-1 and other cryptographic hash functions, the constraints can be determined analogously.

In the optional presolving step 12a, the number of constraints and/or optimization variables can be reduced. By analyzing the constraints, values of some of the optimization variables may be determined before solving the optimization problem as a whole. Starting with the constraints comprising, e.g., $$\begin{aligned} &\vdots \\ &x + y \geq 1 \\ &x + y + z = 1 \\ &\vdots \\ &x, y, z \in \{0, 1\}, \end{aligned} \quad (54)$$

the relations x+y=1−z≤1 can be determined; and from this, the relations x+y=1 and z=0. Subsequently, a modified set of constraints with fewer optimization variables/constraints is determined:

$$\begin{aligned} &\vdots \\ &z = 0 \\ &x + y = 1 \\ &\vdots \\ &x, y \in \{0, 1\}, \end{aligned} \quad (55)$$

Presolving may also be carried out by employing presolving libraries such as PaPILO within SCIP.

Instead of determining and solving the optimization problem as a MILP, the optimization problem can also be determined and solved as a QUBO problem. In particular, the MILP (Eq. (53) and (54)) can be transformed into a QUBO. To this, the constraints (Eq. (53)) are each squared and summed up, resulting in a QUBO objective function $f_{QUBO}$ to be minimized:

$$\begin{aligned} f_{QUBO} = &\left(L_1(B_0, C_0, D_0, F_1, \vec{a}_1)\right)^2 + (\Sigma(F_1, A_0, M_{\mu(1)}, K_1, FM_1, \xi_{1,1}))^2 + \\ &\left(\Sigma(FM_1 << <_{s_1}, B_0, B_1, \xi_{1,2})\right)^2 + (A_1 - D_0)^2 + (C_1 - B_0)^2 + \\ &(D_1 - C_0)^2 + \ldots + \left(L_{64}(B_{63}, C_{63}, D_{63}, F_{64}, \vec{a}_{64})\right)^2 + \\ &(\Sigma(F_{64}, A_{63}, M_{\mu(64)}, K_{64}, FM_{64}, \xi_{64,1}))^2 + \\ &\left(\Sigma(FM_{64} << <_{s_{64}}, B_{63}, B_{64}, \xi_{64,2})\right)^2 + \\ &(A_{64} - D_{63})^2 + (C_{64} - B_{63})^2 + (D_{64} - C_{63})^2 \end{aligned} \quad (56)$$

The optimization problems can also be solved using available solvers. MILP and MINLP can be solved classically using, e.g., CPLEX, Gurobi, Fico XPRESS, ParaSCIP, FiberSCIP, and/or open source SCIP. QUBO problems can be solved classically using general annealing solvers, e.g., Digital Anneal and/or Simulated Bifurcation Machine.

When solving QUBO problems using a quantum processing device, a quantum annealing device (e.g., a D-Wave annealer) may be employed. To this end, the QUBO objective function $f_{QUBO}$ is transferred to the quantum annealing device. The QUBO is then solved in the quantum annealing device, yielding an optimal value allocation for the optimizing variables, in particular the optimal values for the preimage variables $M_k$. From this, the preimage element of the cryptographic hash function can be determined.

The features disclosed in this specification, the figures and/or the claims may be material for the realization of various embodiments, taken in isolation or in various combinations thereof.

The invention claimed is:

1. A method for determining a preimage element of a cryptographic hash function, the method being carried out in a data processing system and comprising:
providing an output value of a cryptographic hash function and hash function operations of the cryptographic hash function;
for each of the hash function operations, determining at least one hash function relation, comprising an equation and/or an inequality;
determining an optimization problem comprising
the output value,
at least one constraint assigned to an iteration of the cryptographic hash function, and
optimization variables comprising internal state variables of the cryptographic hash function and at least one preimage variable,
wherein the at least one constraint is determined from the at least one hash function relation and comprises preceding internal state variables assigned to a preceding iteration; and
solving the optimization problem and determining a preimage element of the cryptographic hash function from an optimizing value of the at least one preimage variable.

2. The method according to claim 1, wherein the hash function operations comprise at least one of: a nonlinear Boolean function, a left bit rotation, a right bit rotation, and a modular addition, in particular at least one of $$F(B,C,D)=(B\wedge C)\vee(!B\wedge D),$$

$$G(B,C,D)=(B\wedge D)\vee(C\wedge !D),$$

$$H(B,C,D)=B\oplus C\oplus D,$$

$$I(B,C,D)=C\oplus(B\wedge !D), \text{ and}$$

$$J(B,C,D)=(B\wedge C)\vee(B\wedge D)\vee(C\wedge D).$$

3. The method according to claim 1, further comprising:
determining elementary operations of at least one of the hash function operations;
for each of the elementary operations, determining at least one elementary relation, comprising an elementary equation and/or an elementary inequality; and
determining the at least one hash function relation from the elementary relations of the at least one hash function operation,
wherein, preferably, the elementary operations comprise at least one of NOT, AND, OR, and XOR.

4. The method according to claim 1, wherein the at least one of the hash function relations and/or at least one of the elementary relations comprises a bilinear equation and/or a linear equation, preferably comprising at least one of continuous variables, binary variables, and integer variables.

5. The method according to claim 4, wherein at least one of the continuous and/or binary variables is determined by solving an initial optimization problem, preferably a constrained quadratic problem.

6. The method according to claim 1, wherein the at least one of the hash function relations and/or the at least one of the elementary relations comprises a linear equation with continuous coefficients, preferably integer-valued coefficients, and binary variables.

7. The method according to claim 1, wherein an initial internal state value and/or a final internal state value are fixed when solving the optimization problem.

8. The method according to claim 1, further comprising: before solving the optimization problem, at least partially presolving the optimization problem.

9. The method according to claim 1, wherein the optimization problem is a mixed-integer linear program, mixed-integer nonlinear program, or a quadratic unconstrained binary optimization problem.

10. The method according to claim 1, wherein the optimization problem is at least partially solved in a quantum processing device of the data processing system, preferably a quantum annealing device.

11. The method according to claim 10, wherein the optimization variables are assigned to a superposition of quantum states and/or the optimizer is a minimum, preferably a global minimum, of the optimization problem.

12. The method according to claim 1, wherein the cryptographic hash function provides information security, preferably for authentication and/or data corruption detection, and/or is one of MD4, MD5, SHA-1, and SHA-2.

13. The method according to claim 1, wherein the preimage element comprises a message and/or data file to be digitally signed and/or verified, preferably for data integrity and/or proof of work.

14. A non-transitory computer-readable medium comprising processor-executable instructions, wherein the processor-executable instructions, when executed, are adapted to cause the data processing system to perform the steps of the method according to claim 1.

15. A data processing system comprising a classical processing device with a processor and a memory, the data processing system configured to determine a preimage element of a cryptographic hash function by performing following steps:
providing an output value of a cryptographic hash function and hash function operations of the cryptographic hash function;
for each of the hash function operations, determining at least one hash function relation, comprising an equation and/or an inequality;
determining an optimization problem comprising
the output value,
at least one constraint assigned to an iteration of the cryptographic hash function, and
optimization variables comprising internal state variables of the cryptographic hash function and at least one preimage variable,
wherein the at least one constraint is determined from the at least one hash function relation and comprises preceding internal state variables assigned to a preceding iteration; and
solving the optimization problem and determining a preimage element of the cryptographic hash function from an optimizing value of the at least one preimage variable.

* * * * *